UNITED STATES PATENT OFFICE.

AUSTIN G. DAY, OF NEW YORK, N. Y.

VULCANIZED PRODUCT TERMED "KERITE."

SPECIFICATION forming part of Letters Patent No. 322,803, dated July 21, 1885.

Application filed June 29, 1885. (No specimens.)

*To all whom it may concern:*

Be it known that I, AUSTIN G. DAY, of the city of New York, in the State and county of New York, have invented an important Improvement in the Vulcanized Product termed "Kerite," which is described in Letters Patent of the United States granted to me on the 3d day of December, 1878, and which is composed of a vulcanized combination of vegetable oils, coal-tar or bitumen, and sulphur; and I hereby declare the following to be a full, clear, concise, and exact description of my said improvement.

The product set forth in my said 1878 Letters Patent has always answered a good purpose, and when combined with india-rubber, in accordance with other Letters Patent granted to me at the same time, has, as is well known, gone into extensive use. It is especially adapted for telegraphic and other insulation, the india-rubber furnishing the insulating properties and the kerite imparting to the combination durability and capacity to resist destructive agencies.

The vulcanized compound of vegetable oils, coal-tar or bitumen, and sulphur, before it is united with the india-rubber, I have generally termed "crude kerite;" and my present invention consists in so modifying this preliminary product by means of substituting new ingredients for a portion or the whole of the sulphur heretofore employed as to insure a much more intimate chemical union of the substances composing the compound than I have hitherto been able to obtain, whereby there are imparted to the kerite improved qualities of the greatest practical importance.

In the manufacture of my compound on a commercial scale I have always heretofore encountered much difficulty, and often great loss, on account of the tendency of the sulphur, in consequence of its rapid action when or after it begins to combine with the oils, to suddenly generate chemical heat of such intensity as to "cook" or overheat the compound and either entirely spoil the batch or seriously impair its value. This danger is referred to in my 1878 patents, and the use of wax and some other substances is described as obviating it. After experimenting for a considerable period, however, I have discovered that by the substitution of other ingredients for a part or, in some cases, for the whole of the sulphur, I can control the action of the heat in a surer and more satisfactory manner than by the use of wax or its equivalents; and, as stated above, by reason of the more thorough chemical union of the oils and the tar which is thereby effected I am able to produce a crude kerite of much better quality than I have heretofore made and to impart to it so great durability and cohesiveness as in the former respect to largely increase its usefulness for all purposes, and in the latter respect to especially add to its value for mixing with india-rubber, and in some cases for employment as a substitute for the rubber itself. The method by which I accomplish this result is simple. I adopt the same mode of treatment as is described in my Patent No. 210,411, of December 3, 1878, and follow it until the point is reached at which in that process the sulphur is introduced—that is to say, I first mix the cotton-seed oil and coal-tar or bitumen together in a suitable kettle or boiler under sufficient heat and for a sufficient length of time to cause them to unite together freely and thoroughly. The temperature ordinarily required for this purpose will be about 300° to 330° Fahrenheit, and the time generally from three to five hours. The mixture is then cooled down to, say, from to 200° to 220° or sometimes to 240° Fahrenheit, or thereabout, and then the linseed-oil may be added. To obtain the best result, however, I prefer to let the cotton-seed oil and the coal-tar or bitumen stand over night to cool. If this latter course be adopted they will be found in the morning to be thoroughly combined, and I then heat them up to the above-specified temperature of from 200° to 220° or sometimes 240° Fahrenheit, and then add the requisite quantity of linseed-oil. When the linseed-oil has become thoroughly incorporated with the other ingredients, which usually takes about one to two hours, and which is the stage of my 1878 process at which I add the sulphur, instead of introducing sulphur in the proportion called for by my 1878 process, I preferably reduce the amount of it about one-half and substitute for the omitted portion an equal quantity of the sulphide of antimony, and introduce the latter, together with the remaining sulphur, into the mixture in the same manner as in my 1878 process—that is, preferably commencing to add it when the temperature of the mixture is about 230° Fahrenheit, and introducing it gradually, and then as it combines with the other ingredients I usually raise the temperature to about 275° to 300° Fahrenheit, or in that vicinity, the degrees of temperature depending largely upon the length of heating-time employed. The heating of the compound may be continued until vulcanization of the mass takes place—say, in the case of a usual working batch of about one hundred pounds, for from three to five hours, or sometimes longer. When the vulcanization is complete, the compound is finished, and it may then be poured into molds or pans of any desired dimensions and allowed to cool for use or for the market.

As in the compound set forth in my 1878 patent, cotton-seed oil, linseed-oil, or other equivalent vegetable oils, and bitumen or coal-tar, or the equivalents for the latter, described in said patent, are essential ingredients of my present product; and, as stated in that patent, their proportions may be greatly varied, but the same proportions there specified are recommended here as adapted to produce a compound suitable for most ordinary purposes—to wit, twenty-seven pounds of cotton-seed oil mixed with, say, twenty pounds of coal-tar or fifteen to twenty-five pounds of bitumen, to which may be added twenty-seven pounds of linseed-oil and from six to eight pounds or thereabout of sulphur and the same amount of the sulphide of antimony.

Instead of sulphide of antimony other sulphides—such as the sulphide of zinc, lead, iron, or copper—may be employed in a similar manner and with beneficial results. In fact, the sulphides of nickel, cobalt, silver, aluminium, &c., might be used but for the reason that their cost renders them impracticable.

In practice, whenever desired, gum-camphor, as well as sulphuric, nitric, or muriatic acid or oxide of iron, may be added to my present compound in the same manner as described in my 1878 patent, but the proportions in which they are used should preferably be considerably larger than there specified.

It will be found to be an important result of using sulphides, as herein described, that as they are stable compounds they greatly tend to prevent oxidation of the kerite after it is manufactured.

Instead of retaining about one-half of the sulphur, as recommended, the whole of it may, if preferred, be dispensed with and the sulphide of antimony or other sulphide substituted for it, care being taken in such case to use about enough of the latter to make the sulphur in it equal to that which in its other form is omitted. This plan, however, will be somewhat more expensive and will not present compensating advantages, and I have obtained equally good or better results when proceeding as above directed.

I am aware that various sulphides have been employed in the manufacture of india-rubber goods; but when so used it has been for a different purpose from for that which I employ them, and they have produced a very different result. Moreover, in that use they obviously have not been combined with substances in the least resembling those with which I combine them in my crude kerite.

Having thus made known my invention, what I claim, and desire to secure by Letters Patent, is—

The within-described new product, consisting of a crude kerite compound formed by the mixture of cotton-seed oil, linseed-oil, coal-tar or bitumen, and the sulphide of antimony or other suitable sulphide, substantially as set forth.

AUSTIN G. DAY.

Witnesses:
EDWARD B. McCLEES,
I. K. HAYES.